US011453391B2

(12) United States Patent
Mahnken et al.

(10) Patent No.: US 11,453,391 B2
(45) Date of Patent: Sep. 27, 2022

(54) METHOD AND APPARATUS FOR OFF ROAD ADAPTIVE CRUISE CONTROL

(71) Applicant: GM GLOBAL TECHNOLOGY OPERATIONS LLC, Detroit, MI (US)

(72) Inventors: Brian Mahnken, Pinckney, MI (US); Jeffrey Louis Brown, Waterford, MI (US); Brent T. Deep, Milford, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 422 days.

(21) Appl. No.: 16/583,912

(22) Filed: Sep. 26, 2019

(65) Prior Publication Data

US 2021/0094537 A1    Apr. 1, 2021

(51) Int. Cl.
*B60W 30/09*    (2012.01)
*B60W 10/06*    (2006.01)
*B60W 10/18*    (2012.01)

(52) U.S. Cl.
CPC .......... *B60W 30/09* (2013.01); *B60W 10/06* (2013.01); *B60W 10/18* (2013.01); *B60W 2400/00* (2013.01); *B60W 2420/42* (2013.01); *B60W 2420/52* (2013.01); *B60W 2554/00* (2020.02); *B60W 2556/60* (2020.02); *B60W 2710/083* (2013.01); *B60W 2710/18* (2013.01); *B60W 2720/106* (2013.01)

(58) Field of Classification Search
None
See application file for complete search history.

(56) References Cited

U.S. PATENT DOCUMENTS

| 2004/0016870 | A1* | 1/2004 | Pawlicki | B60W 10/04 315/77 |
| 2006/0036361 | A1* | 2/2006 | Romer | B60W 30/18172 701/87 |
| 2016/0185350 | A1* | 6/2016 | Kelly | B60W 10/04 701/94 |
| 2017/0326976 | A1* | 11/2017 | Burt | B60W 10/184 |
| 2019/0001977 | A1* | 1/2019 | Lin | B60W 30/16 |

* cited by examiner

*Primary Examiner* — Todd Melton
*Assistant Examiner* — Jason R Roberson
(74) *Attorney, Agent, or Firm* — Lorenz & Kopf LLP

(57) ABSTRACT

The present application relates to a method for performing off road adaptive cruise control in a host vehicle including controlling a vehicle speed at a first speed according to an adaptive cruise control algorithm, detecting an obstacle, using a sensor, within a host vehicle path, reducing the vehicle speed to a reduced speed in response to the detection of the obstacle, detecting a vehicle contact with the obstacle in response to a first inertial measurement unit measurement, applying a brake friction force and increasing an engine torque in response to detecting the vehicle contact with the obstacle, determining a traverse of the obstacle in response to a second inertial measurement unit measurement, and resuming the control of the vehicle speed at the first speed in response to the traverse of the obstacle.

12 Claims, 5 Drawing Sheets

METHOD AND APPARATUS FOR OFF ROAD ADAPTIVE CRUISE CONTROL

BACKGROUND

The present disclosure relates generally to programming motor vehicle control systems. More specifically, aspects of this disclosure relate to systems, methods and devices for providing an adaptive cruise control function in an advanced driver-assistance systems (ADAS) equipped off-road vehicle.

The operation of modern vehicles is becoming more automated, i.e. able to provide driving control with less and less driver intervention. Vehicle automation has been categorized into numerical levels ranging from zero, corresponding to no automation with full human control, to five, corresponding to full automation with no human control. Various ADAS, such as cruise control, adaptive cruise control, and parking assistance systems correspond to lower automation levels, while true "driverless" vehicles correspond to higher automation levels.

Adaptive cruise control systems typically use sensors to detect lane markers and other roadway indicators to generate a motion path for the vehicle to follow to remain within a vehicle lane on the roadway. However, off road driving lacks the requisite lane markers and indicators to perform a traditional adaptive cruise control function on unmarked roads, dirt roads, trails and over other terrain. Furthermore, current off-road adaptive cruise control, or crawl control, requires constant operator vehicle speed adjustment based upon the terrain. Additionally, operators are currently required to resume control when any obstacle, obstruction, or sharp change in ground elevation is encountered in the path of a vehicle performing an off-road adaptive cruise control operation. It would be desirable to overcome these problems to provide a method and apparatus for an ADAS system to automatically adjust vehicle speed in an off-road ADAS equipped motor vehicle.

The above information disclosed in this background section is only for enhancement of understanding of the background of the invention and therefore it may contain information that does not form the prior art that is already known in this country to a person of ordinary skill in the art.

SUMMARY

Disclosed herein are autonomous vehicle control system training systems and related control logic for provisioning autonomous vehicle control, methods for making and methods for operating such systems, and motor vehicles equipped with onboard control systems. By way of example, and not limitation, there is presented an automobile with onboard vehicle control learning and control systems.

In accordance with an aspect of the present invention, an apparatus is provided including a user interface operative to generate a request for an adaptive cruise control function in response a user input, a global positioning system for detecting a host vehicle location, a memory operative to store a map data, a sensor operative to detect an obstacle within a field of view, an inertial measurement unit operative to detect a force on the host vehicle, a vehicle controller operative to control a vehicle speed in response to a speed control signal and an engine speed in response to a torque control signal, a brake controller operative to control a brake apply level in response to a brake control signal, and a processor operative to receive the request for the adaptive cruise control function, to determine an off-road condition in response to the host vehicle location and the map data, and to generate the speed control signal indicative of a first speed, the processor being further operative to generate the speed control signal indicative of a reduced speed in response to the detection of the obstacle within the field of view, to generate the brake control signal in response to the detection of the force on the host vehicle and to generate the torque control signal to increase the engine speed in response to the detection of the force on the host vehicle and the brake control signal, the processor being further operative to generate the speed control signal indicative of the first speed in response to the absence of the force on the host vehicle indicative of the obstacle being traversed by the host vehicle and to couple to the speed control signal to the vehicle controller such that the vehicle controller is operative to resume to control the vehicle speed at the first speed.

In accordance with another aspect of the present invention wherein the sensor is a camera operative to capture an image of the field of view and wherein the obstacle is detected in response to an image processing operation.

In accordance with another aspect of the present invention wherein the sensor is a LIDAR and wherein the obstacle is detected in response to a point map generated by the LIDAR.

In accordance with another aspect of the present invention wherein the force on the vehicle is indicative of an obstacle obstructing the forward movement of the vehicle.

In accordance with another aspect of the present invention wherein the force on the vehicle is a rearward force.

In accordance with another aspect of the present invention wherein the first speed is five miles per hour and the reduced speed is one mile per hour.

In accordance with another aspect of the present invention wherein the first speed is determined in response to the user input.

In accordance with another aspect of the present invention wherein the first speed is a default speed for an off-road adaptive cruise control operation.

In accordance with another aspect of the present invention, a method performed by a processor for controlling a vehicle speed at a first speed according to an adaptive cruise control algorithm, detecting an obstacle, using a sensor, within a host vehicle path, reducing the vehicle speed to a reduced speed in response to the detection of the obstacle, detecting a vehicle contact with the obstacle in response to a first inertial measurement unit measurement, applying a brake friction force and increasing an engine torque in response to detecting the vehicle contact with the obstacle, determining a traverse of the obstacle in response to a second inertial measurement unit measurement, and resuming the control of the vehicle speed at the first speed in response to the traverse of the obstacle.

In accordance with another aspect of the present invention wherein the sensor is a LIDAR system and wherein the obstacle is detected in response to a point cloud generated by the LIDAR system.

In accordance with another aspect of the present invention wherein the sensor is a camera and the obstacle is detected in response to an image processing function.

In accordance with another aspect of the present invention wherein the vehicle speed is reduced gradually between the detecting of the obstacle and the detection of the vehicle contact with the obstacle.

In accordance with another aspect of the present invention wherein the first inertial measurement unit measurement is indicative of a sudden deceleration of the host vehicle.

In accordance with another aspect of the present invention wherein the second inertial measurement unit measurement is indicative of a sudden acceleration of the host vehicle.

In accordance with another aspect of the present invention including detecting a wheel spin in response to the increasing of the engine torque and engaging a wheel lock in response to the wheel spin.

In accordance with another aspect of the present invention wherein controlling the vehicle speed at the first speed is performed in response to a user input indicative of the first speed.

In accordance with another aspect of the present invention including determining an off road condition in response to a map data and a vehicle location measured by a global positioning system and wherein the first speed is determined in response to the off road condition.

In accordance with another aspect of the present invention including determining an off road condition in response to a map data and a vehicle location measured by a global positioning system and engaging a four wheel drive mode in response to the off road condition and an activation of the adaptive cruise control algorithm.

In accordance with another aspect of the present invention, a method for controlling a host vehicle is provided including performing an adaptive cruise control function at a first vehicle speed, detecting an obstruction within a path of the host vehicle, performing the adaptive cruise control function at a second vehicle speed wherein the second vehicle speed is slower than the first vehicle speed, detecting a contact with the obstruction in response to a first inertial measurement unit measurement, applying a brake force to a host vehicle braking system and an increased propulsion torque to a host vehicle engine, detecting a traverse of the obstruction in response to a second inertial measurement unit measurement, and resuming the adaptive cruise control function at the first vehicle speed in response to the detection of the traverse of the obstruction.

In accordance with another aspect of the present invention wherein the obstruction within the path of the host vehicle is detected with a camera and a processor performing an image processing algorithm.

The above advantage and other advantages and features of the present disclosure will be apparent from the following detailed description of the preferred embodiments when taken in connection with the accompanying drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings.

The exemplifications set out herein illustrate preferred embodiments of the invention, and such exemplifications are not to be construed as limiting the scope of the invention in any manner.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
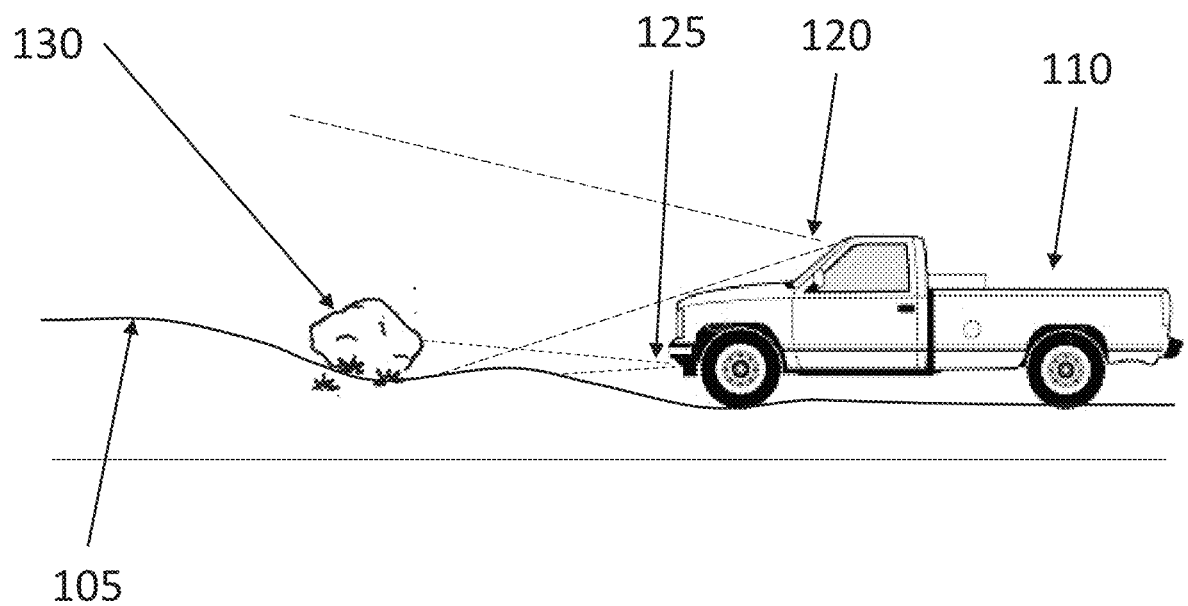
FIG. 1 shows an operating environment for off-road adaptive cruise control for a motor vehicle according to an exemplary embodiment.

FIG. 1 schematically illustrates an operating environment 100 for off-road adaptive cruise control for a motor vehicle 110. In this exemplary embodiment of the present disclosure, an off-road vehicle 110 is traveling in an off-road adaptive cruise control mode along an off-road surface 105. In this exemplary embodiment, the vehicle 110 is equipped with one or more forward-facing cameras having a camera field of view (FOV) 120 and one or more LIDAR systems having a LIDAR FOV 125. Along the surface 105 there are obstacles such as a large rock 130 in the path of the vehicle 110.

In this exemplary embodiment, the vehicle 110 is provided with an adaptive cruise control optimized for off-road vehicle control at low speeds. For example, a vehicle operator may set a maximum vehicle speed set point and the vehicle 110 will integrate forward base cameras 120 and/or LIDAR systems 125 to detect terrain and obstacles within their respective FOVs. The system may then perform a vehicle speed reduction in order to traverse the upcoming terrain and clear obstacles. In low traction terrain an electronic brake control module (EBCM) within the vehicle may also modulate brake and torque control at each wheel to maximize traction.

In an exemplary application, a vehicle operator may set an off-road crawl control speed at 7 mph. This speed may be effective while traveling along most of the surface 105, but along the trail there is a large rock 103 that the vehicle 110 is approaching. The camera 120 and LIDAR 125 systems would be operative to detect and/or map the surface of the rock 130. In response to the detection of the rock 130, the system may reduce the speed of the vehicle gradually while approaching the rock 130. In one exemplary application, once the front wheels touch the rock 130 and the vehicle detects the counter force resulting from the rock 130, the EBCM may apply some brake and to enable increased propulsion torque to climb the obstacle. If excessive wheel slip occurs, not allowing the vehicle to climb, differential lockers may be actuated in order to achieve the climb. Once the vehicle has traversed the rock 130, the vehicle may resume the off road adaptive cruise control function at the previously 7 mph vehicle set speed.

Figure 2:
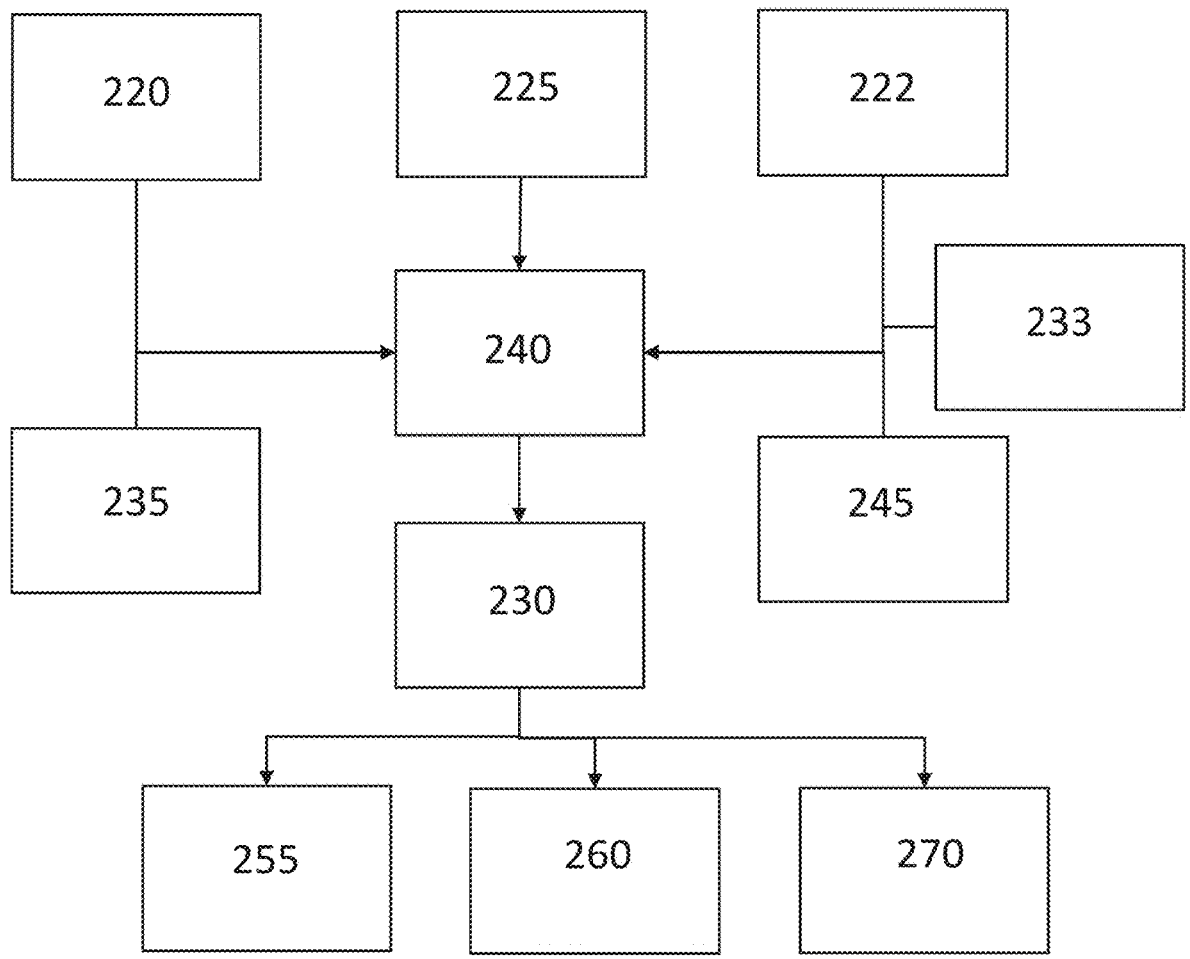
FIG. 2 shows a block diagram illustrating a system for off-road adaptive cruise control for a motor vehicle according to an exemplary embodiment.

Turning now to FIG. 2, a block diagram illustrating an exemplary implementation of a system 200 for off-road adaptive cruise control is shown. The system 200 may include a processor 240, a camera 220, a LIDAR 222, a global positioning system (GPS) 225, an inertial measurement unit (IMU) 233, a user interface 235, a memory 245, a vehicle controller 230 a throttle controller 255, a brake controller 260 and a steering controller 270.

The system is operative to use various sensors such as a camera 220, IMU 233 and LIDAR 222 capable of detecting and mapping various external surfaces, objects and obstacles. Sensor fusion algorithms may be used to provide accurate detection and tracking of external objects as well as calculation of appropriate attributes such as relative velocities, accelerations, and the like. The camera 220 is operative to capture an image of a field of view (FOV) which may include static and dynamic objects proximate to the vehicle. Image processing techniques may be used to identify and locate objects and obstacles within the FOV. These objects and/or obstacles may then be bounded and identified as an undesirable driving area and stored in a memory or added to a reference map for the ADAS. The IMU 233 is a device used to report a specific force of a body. The IMU 233 may measure angular or linear acceleration and may be used to determine a lateral acceleration, a longitudinal acceleration, a yaw rate and pitch of a vehicle.

The LIDAR 222 may be employed as a sensor on the host vehicle to detect surfaces and objects around the vehicle and provide a range to and orientation of those objects using reflections from the objects providing multiple scan points that combine as a point cluster range map, where a separate scan point is provided for every ½° or less across the field-of-view (FOV) of the sensor. Therefore, if a target vehicle or other object is detected in front of the subject vehicle, there may be multiple scan points that are returned that identify the distance of the target vehicle from the subject vehicle. By providing a cluster of scan return points, objects having various and arbitrary shapes, such as rocks, logs, cars, trucks, trailers, bicycle, pedestrian, guard rails, etc., may be more readily detected, where the bigger and/or closer the object to the subject vehicle the more scan points are provided.

Images and data collected by the LIDAR 222 and camera 220 may be used to generate a three-dimensional depth map of a FOV. According to an exemplary embodiment, the three-dimensional depth map may cover a forward-facing field of view wherein a off road driving surface may be mapped including relative elevations of the road surface, objects, obstacles and the like are represented within the three-dimensional depth map. Additional data, such as map data, coupled from a memory 245 or a wireless network may also be used to augment the sensor data in the generation of the depth map. Location data received from a GPS 225 as well as IMU 233 may be used to determine a relative vehicle location with respect to the received map data.

In an alternate embodiment, the LIDAR 222 may be replaced or augmented with a RADAR system to generate the three-dimensional depth map of the FOV. The RADAR system is operative to transmit an electromagnetic pulse towards the FOV and to receive a reflection of the electromagnetic pulse from an object, obstacle, and/or target within the FOV. The distance to the target from the RADAR may be determined in response to the time of flight of the electromagnetic pulse. The RADAR data may be used to augmented and/or correlate the LIDAR data and/or the image data.

The user interface 235 may be a user input device, such as touch screen, dial, or button located in the vehicle cabin and accessible to the driver. Alternatively, the user interface 235 may be a program running on an electronic device, such as a mobile phone, and in communication with the vehicle, such as via a wireless network. The user interface 235 is operative to collect instructions from a vehicle operator such as initiation and selection of an ADAS function, desired vehicle speed for adaptive cruise operations, selection of vehicle motion profiles for assisted driving, etc. In response to a selection by the vehicle operator, the user interface 235 may be operative to couple a control signal or the like to the processor 240 for activation of the ADAS function.

In this exemplary embodiment, the processor 240 may be operative to perform a method for off-road adaptive cruise control in response to signals from various vehicle sensors, the vehicle controller 230 and the user interface 235. In one exemplary embodiment, the processor 240 may be operative to perform an off-road adaptive cruise control function, or "crawl control" function where the forward speed of the vehicle in maintained in response to a set speed selected by a vehicle operation via the user interface, wherein the set speed is adjusted according to driving surface features, objects, and other obstacles detected ahead of the vehicle. For example, in response to detecting an upcoming obstacle, such as a log across the vehicle path, the processor 240 may generate a control signal to reduce the speed of the vehicle when approaching the log in order to slowly traverse the log and then resume the vehicle operator selected speed once the log has been traversed. In one exemplary application, the steering of the vehicle may be controlled by the vehicle operator, wherein another exemplary application, the steering may be controlled without operator interaction in response to an ADAS algorithm.

In an exemplary embodiment of the system 200 for off road adaptive cruise control in a motor vehicle, the processor 240 is operative perform an off-road adaptive cruise control algorithm. The processor 240 may be a vehicle controller, an ADAS control, digital signal processor or other control processor circuitry or logic. According to an exemplary embodiment, the processor 240 is first operative to receive an indication of a user input to perform the off-road adaptive cruise control function. The user input may be received via the user interface 235 and may be indicative of a desired speed for the off-road adaptive cruise control function. Alternatively, the user input may be received in response to another ADAS function in response to, for example, the vehicle transitioning from a road surface environment to an off-road environment.

In response to the user input, the processor 240 is operative to generate a control signal for coupling to a vehicle controller 230 or the like to maintain the set speed during the off-road adaptive cruise control function. The processor 240 is further operative to receive data from the various sensors, such as the LIDAR 222 and camera 220 to detect the presence of objects, changes in road surfaces, or obstacles in the path of the vehicle. If an object is detected, the processor 240 may be operative to generate a control signal to couple to the vehicle controller 230 to reduce the speed of the vehicle. For example, the speed of the vehicle may be reduced to a speed at which contact with the obstacle will not cause damage to the vehicle or discomfort to the vehicle occupants, such as one mile per hour. The speed may be immediately reduced or may be gradually reduced as the vehicle gets closer to the obstacle. The processor 240 is operative to maintain the reduced speed until the obstacle is cleared or until contact is made with the obstacle.

The processor 240 is further operative to determine if contact has been made with a detected obstacle, such as a rock, log or rock face. The processor 240 may determine contact has been made in response to data received from the IMU 233, data from the GPS 225, map data stored in a memory 245 or data from the vehicle controller 230 indicating a change in torque ratio, vehicle speed, or the like. In response to the determination of contact with the obstacle, the processor 240 is operative to generate a control signal to couple to the vehicle controller 230 to increase brake apply to increase brake friction and to increase torque to enable to vehicle to climb the obstacle. If excessive wheel spin is detected by the vehicle controller 230, the processor may further request a wheel lock be performed on the vehicle wheels to spread the engine torque over additional drive wheels.

The processor 240 is further operative to estimated if the obstacle has been traversed in response to signals from the IMU 233, GPS 225, and/or vehicle controller 230. If the processor determines that the obstacle has been traversed, the processor 240 resumes the original off-road adaptive cruise control function at the original set speed. The processor 240 may be operative to perform the off-road adaptive cruise control during a vehicle operator controlled steering function or in response to an ADAS controlled steering function. In accordance with an ADAS controlled steering function, the processor 240 or other ADAS controller may first attempt to avoid the obstacle before trying to traverse the obstacle.

The vehicle controller 230 may generate control signals for coupling to other vehicle system controllers, such as a throttle controller 255, a brake controller 260 and a steering controller 270 in order to control the operation of the vehicle in response to the ADAS algorithm. The vehicle controller may be operative to adjust the speed of the vehicle by reducing the throttle via the throttle controller 255 or to apply the friction brakes via the brake controller 260 in response to a control signals generated by the processor 240. An increase in throttle may increase the propulsion torque. In an electric vehicle, the throttle controller 255 may be operative to regulate propulsion power to the electric motor. Throttle controller 255 may be further controlled in response to an accelerator pedal to control propulsion and/or increase torque. The vehicle controller may be operative to adjust the direction of the vehicle controlling the vehicle steering via the steering controller 270 in response to a control signals generated by the processor 240.

Figure 3:
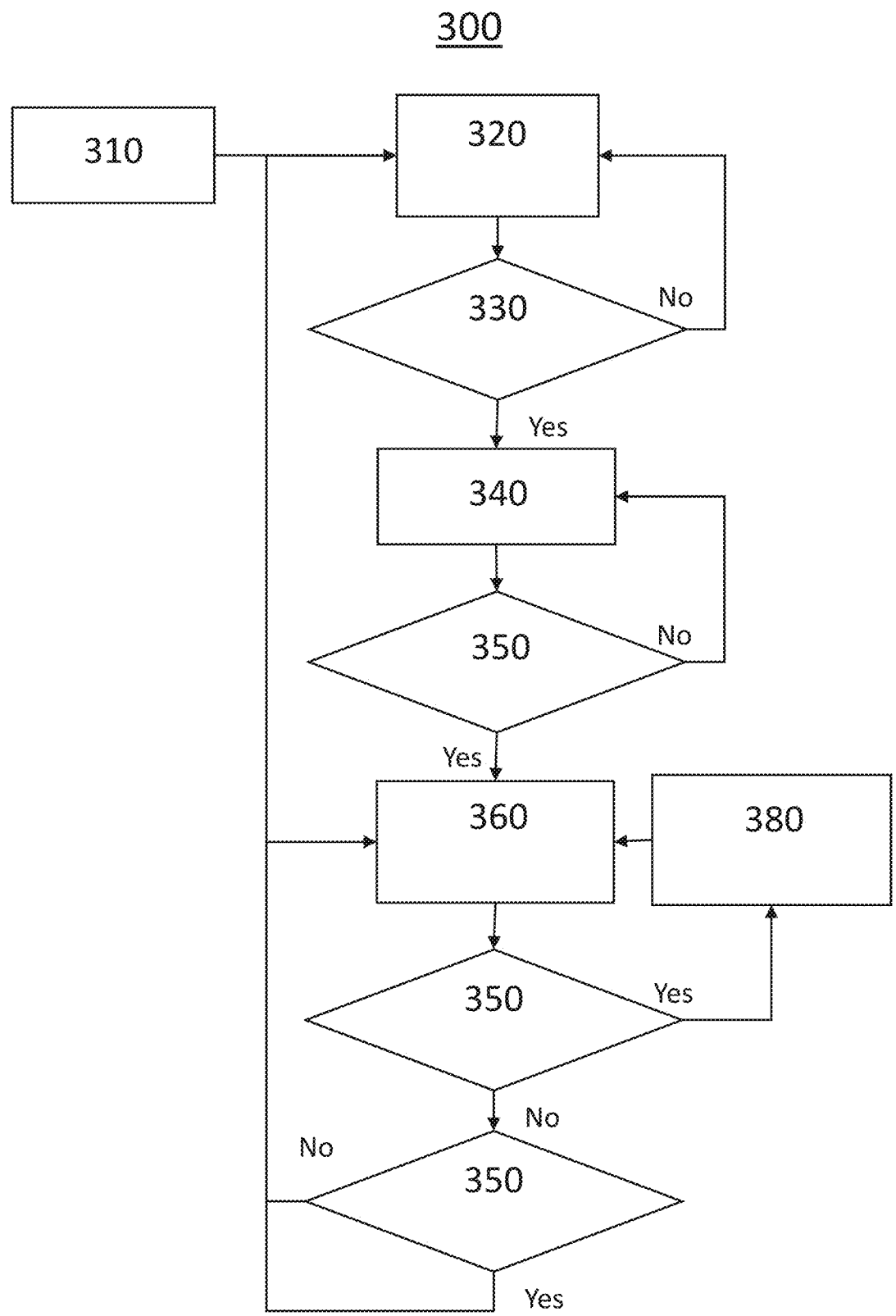
FIG. 3 shows a flow chart illustrating a method for off-road adaptive cruise control for a motor vehicle according to another exemplary embodiment.

Turning now to FIG. 3, a flow chart illustrating an exemplary implementation of a method 300 for off-road adaptive cruise control in a motor vehicle is shown. The method is first operative to receive 310 a control signal indicative of a request to initiate an off-road adaptive cruise control mode. The control signal may be indicative of a user set speed, such as 7 miles per hour, or a default set speed may be used for off-road adaptive cruise control mode. The control signal may be generated in response to a user input received via a user interface or may be initiated by an ADAS controller in response to an assisted driving mode transitioning to an off-road surface.

The method is next operative to engage 320 the off-road adaptive cruise control mode at the set speed in response to the control signal. The off-road adaptive cruise control mode may be performed along with a driver controlled steering operation or with an ADAS controlled steering operation.

During the off-road adaptive cruise control mode, the method is operation to control the vehicle speed at the set speed and to scan the upcoming road surface for obstacles 330, changes in road surface, obstructions and the like using one or more vehicle sensors having a forward FOV. The vehicle sensor may be a LIDAR, camera, radar of combination thereof. If no changes in road surface or obstacles are detected greater than a threshold size, such as 12 inches in size, the method is operative to continue 320 the off-road adaptive cruise control mode until the mode is ceased by a vehicle operator or in response to an instruction from the ADAS.

If an obstacle or change in road surface elevation above the threshold size is detected 330, the method is next operative to decrease 340 the speed of the off-road adaptive cruise control mode. The speed may be decreased to a default speed, such as one mile per hour, or may be gradually decreased in response to the distance to the obstacle. For example, upon detection of the obstacle, the method may be operative to gradually decrease the speed of the vehicle from the set speed, such as seven miles per hour, to one mile per hour at the detected location of the obstacle.

While performing the off-road adaptive cruise control mode at the decreased speed, the method is next operative to determine 350 if contact has been made with the obstacle. In an exemplary embodiment, contact with the obstacle may be determined in response a sudden decrease in vehicle speed, an acceleration or force detected by an IMU or the like, or a sudden change in torque ratio or torque multiplication. For example, if the forward speed of the vehicle is zero miles per hour and the engine speed is indicative of a force counter for forward progress of the vehicle, the method may assume that contact with the obstacle has been made.

In response to detecting contact with the obstacle, the method is next operative to apply some braking force for the vehicle by generating a control signal or the like to couple to a vehicle controller or a brake controller. The method is then operative to increase the torque of the vehicle powertrain in order for the vehicle wheel to climb the obstacle. In an exemplary embodiment, propulsion torque may be increased in response to a throttle control signal coupled to a throttle controller or vehicle controller to increase an engine speed in order to increase torque. In an alternate embodiment for an electric vehicle, torque may be increased by increasing propulsion power to an electric motor.

During the application in braking force and/or increase in torque, the method may next be operative to determine 370 if wheel slip is detected. In one exemplary embodiment, wheel slip may be determined in response to an output from a wheel speed sensor or the like and compared to a forward speed of the vehicle. If wheel slip is detected, the method may next be operative to engage differential lockers. In an exemplary embodiment, differential lockers may be engaged in response to a control signal generated by the method and coupled to a vehicle controller, gearbox controller, or the like and are operative to mechanically lock the wheels into a torque ratio between each side of an axle or between a front and rear axle or any combination thereof.

As the method is applying the braking force and/or increasing torque to the powertrain, the method is next operative to detect 380 a traverse of obstacle by the vehicle. In an exemplary embodiment, of the obstacle may be determined in response a sudden increase in vehicle speed, an acceleration or force detected by an IMU or the like, or a sudden change in torque ratio or torque multiplication. For example, if the forward speed of the vehicle is zero miles per hour and the engine speed is indicative of a force counter for forward progress of the vehicle and/or the engine speed suddenly decreases and the forward speed increases from zero miles, the method may assume that a traverse of the obstacle has been made. In an exemplary embodiment of the present method, a traverse of the obstacle by the vehicle may be determined in response to a traverse of a front wheel/axle of the vehicle and a rear wheel/axle of the vehicle each traversing the obstacle. In this exemplary embodiment, the previously described method steps may be repeated for each wheel/axle. Once a traverse of the obstacle has been detected, the method is operative to reengage 320 the off-road adaptive cruise control mode at the set speed.

Figure 4:
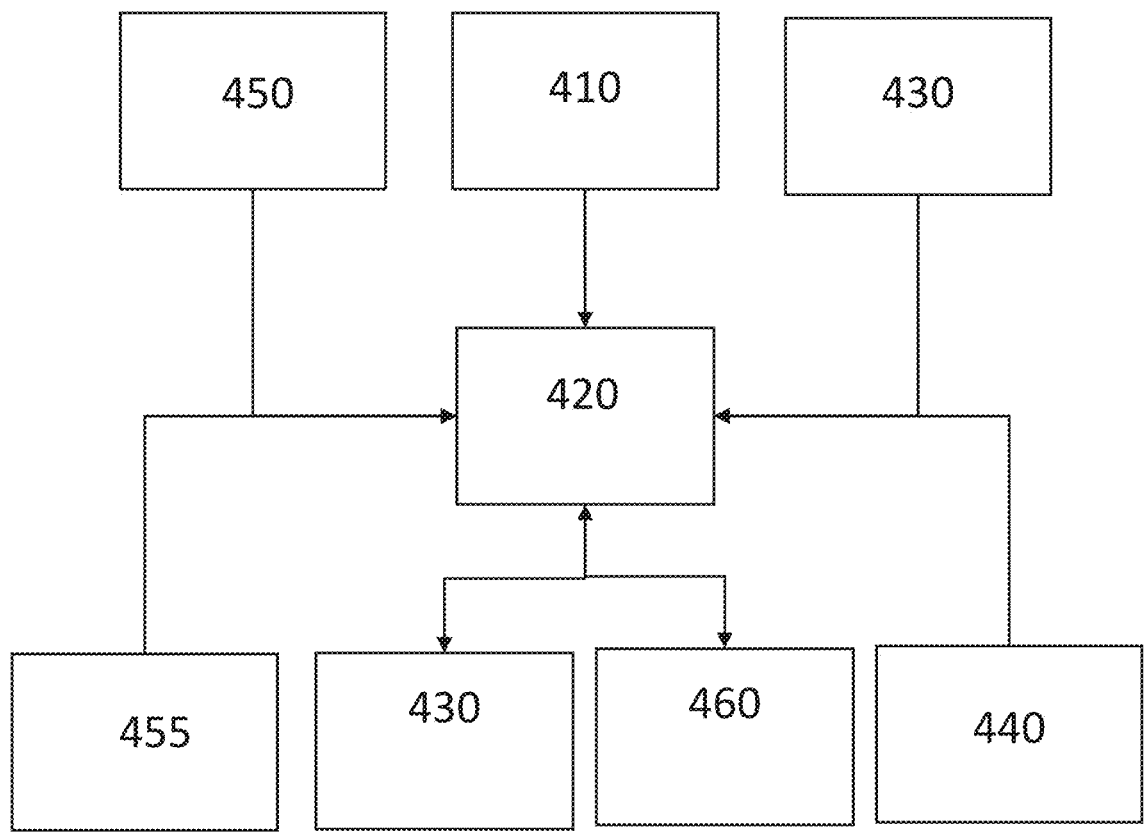
FIG. 4 shows a block diagram illustrating a system for off-road adaptive cruise control for a motor vehicle according to another exemplary embodiment.

Turning now to FIG. 4, a block diagram illustrating another exemplary implementation of a system 400 for off road adaptive cruise control in a vehicle is shown. The exemplary system 400 may include a user interface 430 operative to generate a request for an adaptive cruise control function in response a user input. The user interface may be a touch screen display, a button, knob, switch or any combination thereof. The request for the adaptive cruise control function may further include an indication of a first speed at which the adaptive cruise control function will initially maintain the vehicle speed.

The system 400 may further include a GPS 450 for detecting a host vehicle location in response to one or more satellite signals and wherein the GPS 450 is collocated with the host vehicle. The host vehicle location may include a longitude, latitude and may include an altitude. The exemplary system 400 may further include a memory 440 operative to store a map data wherein the map data may be received by a wireless network and is representative of an area proximate to the host vehicle.

The exemplary system may further include at least one sensor 410 operative to detect an object within a field of view. The sensor 410 may be a camera operative to capture an image of the field of view and wherein the object is detected in response to an image processing operation performed by the camera, a processor within the camera or an image processor located within the host vehicle. Alternatively, the sensor 410 may be a LIDAR and wherein the object is detected in response to a point map generated by the LIDAR. The point map may be stored on the memory 440 wherein the processor 420 is operative to access the memory 440.

The IMU 455 is operative to detect a force on the host vehicle, such as a lateral force, a longitudinal force, an acceleration or the like. The IMU 455 may be operative to detect a force of the host vehicle indicative of an object obstructing the forward movement of the vehicle, such as a rearward force. The IMU 455 may detect a sudden deceleration or sudden acceleration indicative of the host vehicle contacting an obstacle or traversing an obstacle.

The vehicle controller 430 may operative to control a vehicle speed in response to a speed control signal and an engine speed in response to a torque control signal. The vehicle controller 430 may be in communications with a throttle controller, a steering controller, the processor 420 and a brake controller 460. The brake controller 460 may be operative to control a brake apply level in response to a brake control signal from the processor 420 and/or the vehicle controller 430.

According to an exemplary embodiment, the processor 420 may be operative to receive the request for the adaptive cruise control function, to determine an off-road condition in response to the host vehicle location and the map data, and to generate the speed control signal indicative of a first speed. The first speed may be a crawl speed and may be determined in response to the user input. Alternatively, the first speed may be a default speed for an off-road adaptive cruise control operation.

The processor 420 may be further operative to generate the speed control signal indicative of a reduced speed in response to the detection of the object within the field of view. The speed may be reduced suddenly or may be reduced over the distance between the object and the host vehicle. The processor 420 may then generate the brake control signal in response to the detection of the force on the host vehicle and to generate the torque control signal to increase the engine speed in response to the detection of the force on the host vehicle and the brake control signal. The brake force and/or the increased torque may facilitate the host vehicle traversing the object or an obstruction. The processor 420 may then be further operative to generate the speed control signal indicative of the first speed in response to the absence of the force on the host vehicle indicative of the object being traversed by the host vehicle. The processor 420 may then couple to the speed control signal to the vehicle controller 430 such that the vehicle controller is operative to resume to control the vehicle speed at the first speed. In an exemplary embodiment, the first speed is five miles per hour and the reduced speed is one mile per hour wherein the speeds are suitable for off road operation and traversing obstructions respectively.

Figure 5:
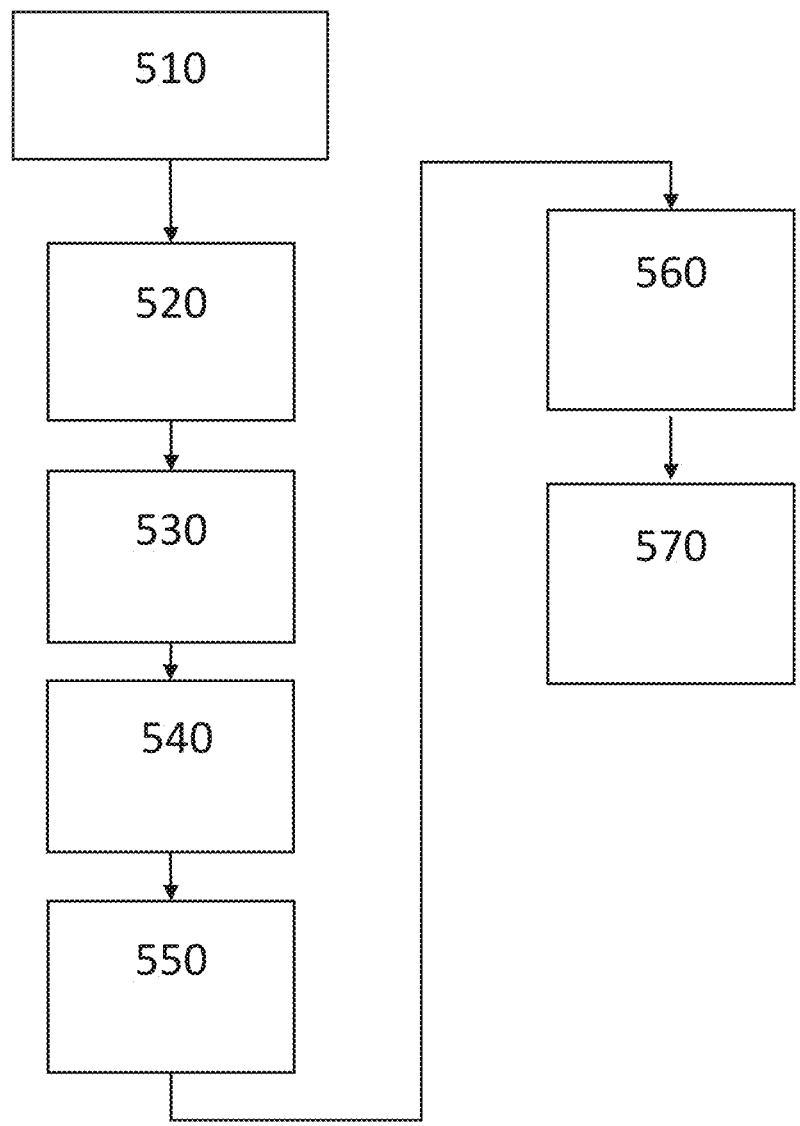
FIG. 5 shows a flow chart illustrating a method for off-road adaptive cruise control for a motor vehicle according to another exemplary embodiment.

Turning now to FIG. 5, a flow chart illustrating an exemplary implementation of a system 500 for off road adaptive cruise control in a host vehicle is shown. The method may be performed by an ADAS processor or the like and is first operative for controlling 510 a vehicle speed at a first speed according to an adaptive cruise control algorithm. An initiation of the adaptive cruise control algorithm may be performed in response to a user input received via a user interface or via a control from an alternative ADAS algorithm. The first speed may be determined in response to a determination that the host vehicle is operating in an off-road environment. The off-road environment may be determined in response to a map data and a vehicle location measured by a global positioning wherein the map data indicates that the vehicle location is not proximate to a roadway. Alternatively, the off-road environment may be assumed in response to an absence of road markers in a detected field of view. In one exemplary embodiment, the off-road condition is determined in response to a map data stored in a memory and a vehicle location measured by a global positioning system. The method may be operative to engage and engaging a four-wheel drive mode in response to the off road condition and an activation of the an adaptive cruise control algorithm.

The method is next operative for detecting 520 an obstacle, using a sensor, within a host vehicle path. In one exemplary embodiment, the sensor is a LIDAR system and wherein the obstacle is detected in response to a point cloud generated by the LIDAR system. In an alternative embodiment, the sensor is a camera and the obstacle is detected in response to an image processing function. The method may then reduce 530 the vehicle speed to a reduced speed in response to the detection of the obstacle. According to one example, the vehicle speed may be reduced gradually between the detecting of the obstacle and the detection of a vehicle contact with the obstacle. According to one example, the vehicle speed may be reduced gradually between the detecting of a location of the obstacle and the detection of current location of the host vehicle. The method is next operative for detecting 540 a vehicle contact with the obstacle in response to a first inertial measurement unit measurement. The first inertial measurement unit measurement may be indicative of a sudden deceleration of the host vehicle In response to detecting the vehicle contact with the obstacle, the method is next operative for applying 550 a brake friction force and/or increasing an engine torque in response to detecting the vehicle contact with the obstacle. In one embodiment, the method may be operative for detecting a wheel spin in response to the increasing of the engine torque. The method may then engage a wheel lock in response to the wheel spin. The method is next operative to determine 560 a traverse of the obstacle in response to a second inertial measurement unit measurement. The second inertial measurement unit measurement may be indicative of a sudden acceleration of the host vehicle. The method finally is operative to resume 570 control of the vehicle speed at the first speed in response to the traverse of the obstacle.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method performed by a processor comprising:
controlling a vehicle speed at a first speed according to an adaptive cruise control algorithm for an off road condition;
detecting an obstacle, using sensor operative to detect the obstacle within a field of view, within a host vehicle path;
reducing the vehicle speed to a reduced speed before a vehicle contact with the obstacle in response to the detection of the obstacle;
detecting the vehicle contact with the obstacle in response to a first inertial measurement unit measurement;
applying a brake friction force and increasing an engine torque in response to detecting the vehicle contact with the obstacle;
determining a traverse of the obstacle in response to a second inertial measurement unit measurement; and
resuming the control of the vehicle speed at the first speed in response to the traverse of the obstacle.

2. The method of claim 1 wherein the sensor comprises a LIDAR system and wherein the obstacle is detected in response to a point cloud generated by the LIDAR system.

3. The method of claim 1 wherein the sensor comprises a camera and the obstacle is detected in response to an image processing function.

4. The method of claim 1 wherein the vehicle speed is reduced between the detecting of the obstacle and the detection of the vehicle contact with the obstacle.

5. The method of claim 1 wherein the first inertial measurement unit measurement is indicative of a deceleration of the host vehicle.

6. The method of claim 1 wherein the second inertial measurement unit measurement is indicative of an acceleration of the host vehicle.

7. The method of claim 1 further including detecting a wheel spin in response to the increasing of the engine torque and engaging a wheel lock in response to the wheel spin.

8. The method of claim 1 further including wherein controlling the vehicle speed at the first speed is performed in response to a user input indicative of the first speed.

9. The method of claim 1 further comprising determining the off road condition in response to a map data and a vehicle location measured by a global positioning system and wherein the first speed is determined in response to the off road condition.

10. The method of claim 1 further comprising determining the off road condition in response to a map data and a vehicle location measured by a global positioning system and engaging a four wheel drive mode in response to the off road condition and an activation of the adaptive cruise control algorithm.

11. A method for controlling a host vehicle comprising:
performing an adaptive cruise control function for an off road condition at a first vehicle speed;
detecting with a sensor, an obstruction within a field of view and within a path of the host vehicle;
performing the adaptive cruise control function at a second vehicle speed before a vehicle contact with the obstruction, wherein the second vehicle speed is slower than the first vehicle speed;
detecting a vehicle contact with the obstruction in response to a first inertial measurement unit measurement;
applying a brake force to a host vehicle braking system and an increased propulsion torque to a host vehicle engine;
detecting a traverse of the obstruction in response to a second inertial measurement unit measurement; and
resuming the adaptive cruise control function at the first vehicle speed in response to the detection of the traverse of the obstruction determined in response to a traverse of the obstruction of a front wheel of the host vehicle and a traverse of the obstruction of a rear wheel of the host vehicle.

12. The method for controlling the host vehicle of claim 11 wherein the obstruction within the path of the host vehicle is detected with a camera and a processor performing an image processing algorithm.

* * * * *